May 31, 1960

J. E. TIEMAN 2,938,321

COTTON HARVESTER WITH FORWARD GATHERING MEANS

Filed May 9, 1957

INVENTOR
JAMES EDGAR TIEMAN

BY
*Harvey & Harvey*
ATTORNEYS

May 31, 1960 J. E. TIEMAN 2,938,321
COTTON HARVESTER WITH FORWARD GATHERING MEANS
Filed May 9, 1957 3 Sheets-Sheet 2

INVENTOR
JAMES EDGAR TIEMAN

BY
ATTORNEYS

May 31, 1960 J. E. TIEMAN 2,938,321
COTTON HARVESTER WITH FORWARD GATHERING MEANS
Filed May 9, 1957 3 Sheets-Sheet 3

INVENTOR
JAMES EDGAR TIEMAN
BY
*Garney + Garney*
ATTORNEYS

United States Patent Office 2,938,321
Patented May 31, 1960

2,938,321

COTTON HARVESTER WITH FORWARD GATHERING MEANS

James Edgar Tieman, 548 S. Horne St., Mesa, Ariz.

Filed May 9, 1957, Ser. No. 658,113

5 Claims. (Cl. 56—12)

The present invention is an apparatus and method for salvaging cotton that remains on the ground after harvesting, and has for an object to force the waste cotton from the furrows to a position on top of the rows preparatory to picking up the waste cotton and transferring it to a temporary storage point.

Other objects of the invention are to provide a cotton salvage apparatus which, quickly and with facility, may be connected to a vehicle and pushed or pulled by the latter over the harvested rows; to provide waste cotton salvage apparatus which includes a picker wheel movable over a row, pursuant to gathering the waste cotton thereon, the wheel being articulate, to automatically conform to inequalities in the cotton row thereby insuring consummate salvaging and to provide a mechanism for transferring the cotton, removed from the picker wheel, to a receptacle which may be carried by the vehicle.

Other objects of the invention will be manifest from the following description of the present preferred form of the invention, taken in connection with the accompanying drawings, wherein:

Fig. 4 is a detail enlarged fragmentary elevational view of the cotton picking wheel of the present invention;

Fig. 5 is a fragmentary sectional view of the picking wheel shown in Fig. 4, taken on the line 5—5 of Fig. 4, looking in the direction of the arrows, and looking at the inside of the wheel showing to advantage the means used for urging the segments of the picker wheel outward.

Figure 1:
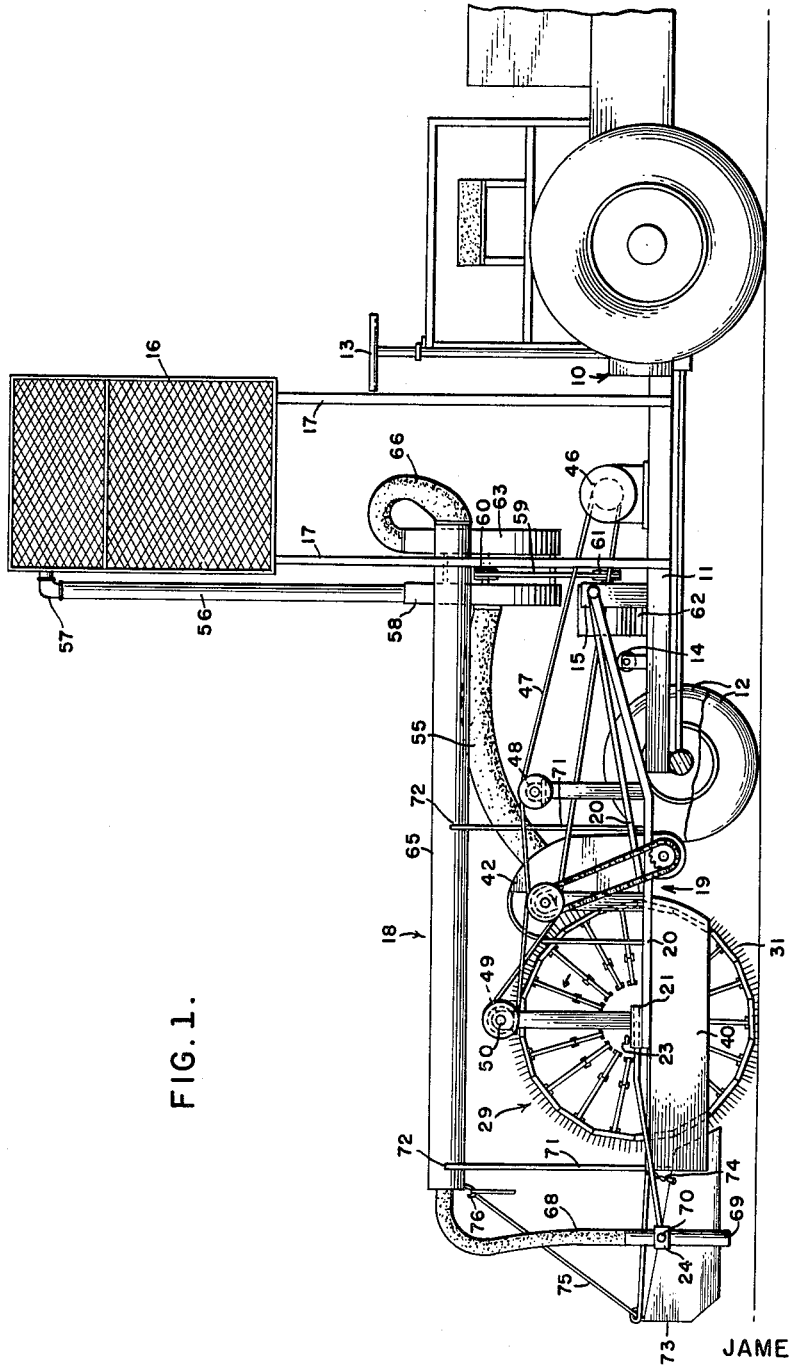
Fig. 1 is a side elevational view of a cotton salvaging machine constructed in accordance with the present invention, illustrating its application to a power-operated vehicle.
Figure 2:
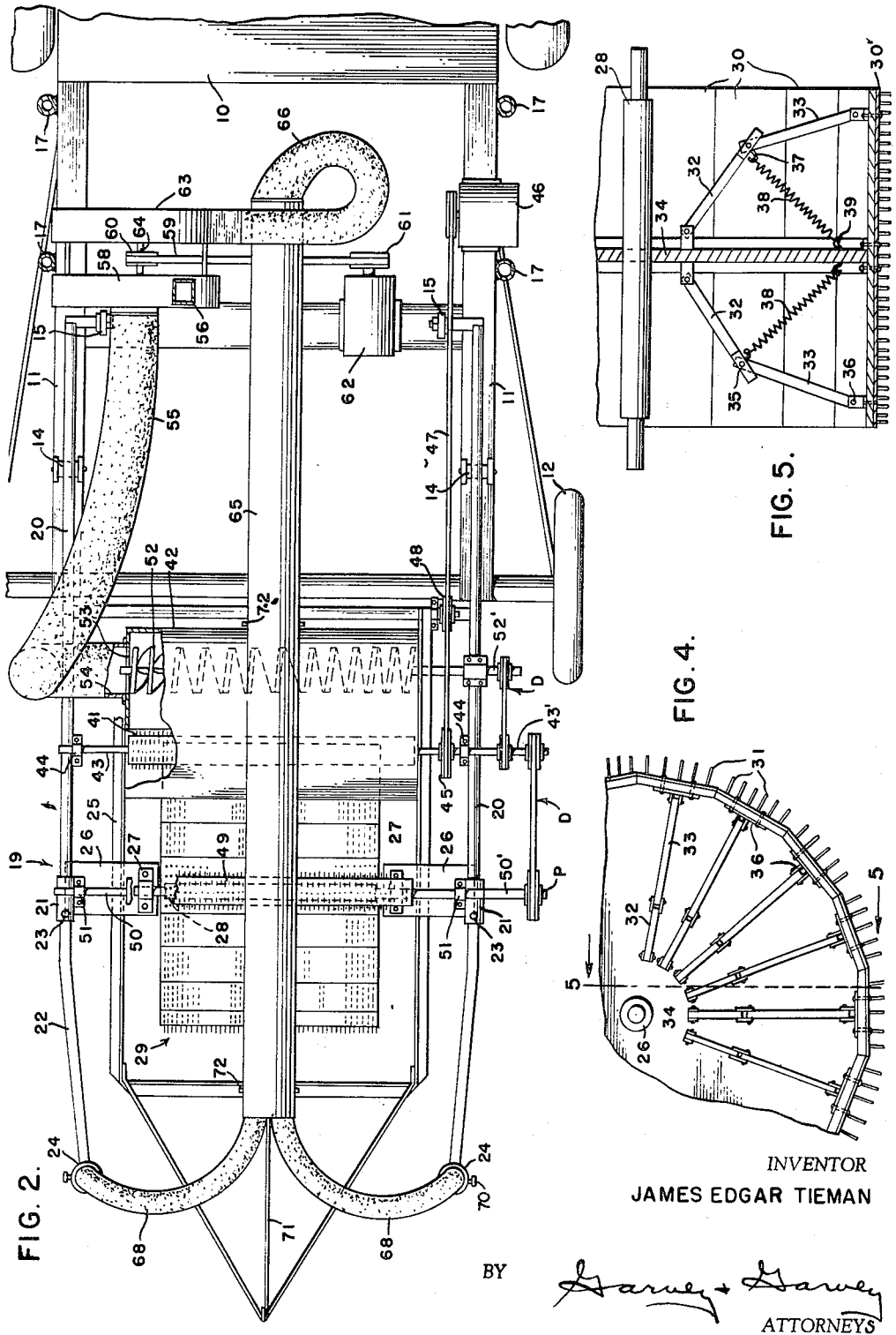
Fig. 2 is a top plan view of the same with parts broken away.

To illustrate the application of this invention, there is shown to advantage in Figs. 1 and 2, a power operated vehicle 10 which may include a chassis 11, dirigible wheels 12 connected to the fore end of the chassis and in operative connection with a steering wheel 13 in any conventional manner. The chassis also is equipped with rollers 14 and posts 15. The chassis is additionally adapted to support a perforate cotton-receiving basket 16 which is held in elevated position appreciably above the chassis by tubular supports 17.

The device of the present invention consists of a cotton picker assembly generally designated 18 and embodies a frame 19, including two side members 20, the front end of each of which is adapted to ride over one of the rollers 14 into engagement with a post 15. The aft end of each of the sides 20 carries an elongated sleeve 21, each of which is adapted for the reception of the inner end of a strut 22, said inner end being rotatable for a purpose hereinafter set forth, and held in a desired position by a setscrew 23. The outer end of each strut terminates in a collar 24 for a purpose which will also be later described. The assembly further includes a rectangular sub-frame 25 which is supported on the main frame 19 by beams 26 which extend inwardly in the sub-frame 25 as shown in Fig. 2, and carry bearings 27. An axle 28 extends through the cotton picking wheel generally designated 29, the ends of the axle being reduced and mounted in the bearings 27. The wheel 29 is of articulate construction so as to conform to irregularities in the ground surface when the apparatus is propelled over a harvested row. The wheel in the present instance comprises a plurality of segments 30, the outer faces of which carry wire picker fingers 31 which are mounted on a suitable flexible backing of rubber and cord or the like. The inner face of each segment is engaged by brake joints, each consisting of a pair of ribs 32 and 33. Each rib 32 has its inner end pivotally secured to a central disc 34 of wheel 29, the opposite end being pivotally engaged to one end of rib 33, as indicated at 35, the opposite end of the rib 33 being pivotally engaged to one of the segments as shown at 36. Each of the ribs 33 carries a hook 37 which is engaged by one end of a helical spring 38, the opposite end of each spring being engaged with a hook 39 carried by the disc 34 as shown to advantage in Fig. 5. An apron 40 depends from each side of the sub-frame 25 downwardly to a point in proximity to the ground to protect the picker wheel.

When the apparatus is propelled over a harvested row, the picker wheel moves in a counterclockwise direction, as viewed in Fig. 1, and picks up gathered cotton, carrying it up to a point where it is removed by a sweep off brush 41 into a catch shield 42. The sweep off brush also moves in a clockwise direction and is equipped with a shaft 43, the opposite ends of which are journaled in bearings 44 carried by the sides 20 of main frame 19. The shaft 43 has a power pulley 45 which is engaged with a motor 46 by belt 47 trained over idler 48. The motor 46 may be mounted on the chassis of the vehicle 10 as shown in Figs. 1 and 2. One end of the shaft 43 is extended laterally beyond one of the sides 20, as indicated at 43' for engagement with multiple power drive means presently to be described. Positioned immediately above the wheel 29 is a wire fluffer brush 49 which is adapted for engagement with the fingers 31 to fluff or straighten the latter after the cotton has been removed therefrom. The brush 49 is mounted on a shaft 50, the ends of which are journaled in bearings 51 superimposed on the beams 26. One end of the shaft 50 is extended beyond one of the sides 20 as indicated at 50' for engagement with one part of the multiple drive means D. The multiple drive means may consist of any conventional power transmission media such as belts and pulleys. In the present instance, power is taken off the shaft 43 and transmitted to a pulley P, shown to advantage in Fig. 2, on the extension 50' of the wire fluff brush shaft, as illustrated in Fig. 2.

As the cotton is removed from the picker wheel by the sweep off brush, it falls into the catch shield 42 at the bottom of which latter a feed auger 52 is rotatably mounted. One end of the shield opens, as indicated at 53, into one end of an elbow 54, the latter communicating with a flexible tube 55 which communicates with a tube 56 that empties into the basket 16 as indicated at 57. A spider 42' is mounted in the opening 53 to receive an end of the auger shaft. The opposite end 52' of said shaft is in operative connection through drive means D, with the shaft 43 as illustrated to advantage in Fig. 3. The cotton is carried from the catch shield 42 and urged into the basket 16 by any conventional means used in the art, such as a fan 58. The fan 58 is operated through belt 59 trained over pulleys 60 and 61, the former being mounted on the fan shaft and the latter being engaged with the shaft of motor 62.

The cotton picker assembly additionally embodies a blower unit which includes a blower 63 operated by motor 62 through the belt 59, pulleys 60 and 61, as advantageously illustrated in Fig. 2. A single shaft 64 is employed for imparting movement to the fan 58 and blower 63 in an obvious manner. The blower 63 is in communication with one end of a conduit 65, the latter including a main body portion which extends horizontally above the wheel 29 and the rear end of vehicle 10, as shown to advantage in Figs. 1 and 2. The aft end of the conduit 65 consists of a flexible tube 66, one end of which latter is in communication with the main body of the conduit, the opposite end being connected in a suitable manner, to the blower 63. The forward end of the main body of the conduit is closed by a plate 67 which carries the inner ends of flexible tubular branches 68, the latter, as illustrated to advantage in Figs. 1 and 3, extending downwardly and engaged in pipes 69, the latter being adjustably mounted in collars 24 and held in predetermined adjusted position by setscrews 70. By this arrangement, the branches may be vertically adjusted to vary the proximity of the open ends of the pipes 69 to the ground. Furthermore, lateral adjustment of the pipes 69 may be effected by moving the lower terminals of the pipes inwardly or outwardly with respect to the harvested row being traversed by the cotton picker when the setscrews 23 are loose. After the desired lateral position has been attained, the screws 23 are tightened. The main body of the conduit 65 is supported by two or more vertical standards 71 carried by the sub-frame 25, the upper ends of the standards including curved extensions 72 which embrace the conduit as shown in Fig. 1.

Figure 3:
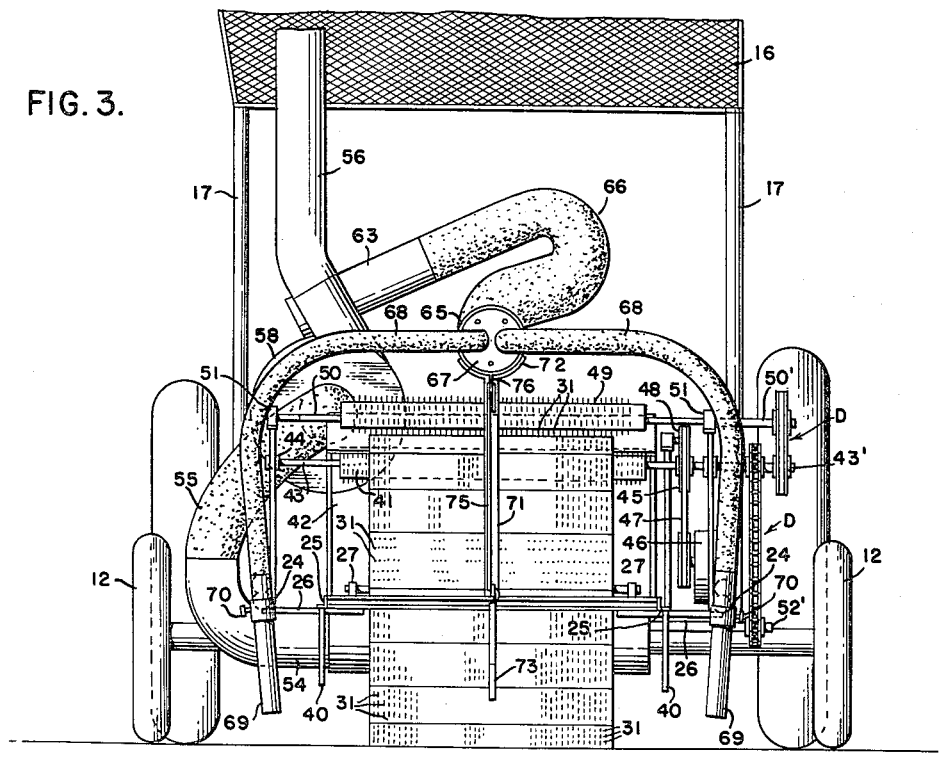
Fig. 3 is a front elevational view of the invention showing, inter alia, the position of the branches of the blower.
Figure 6:
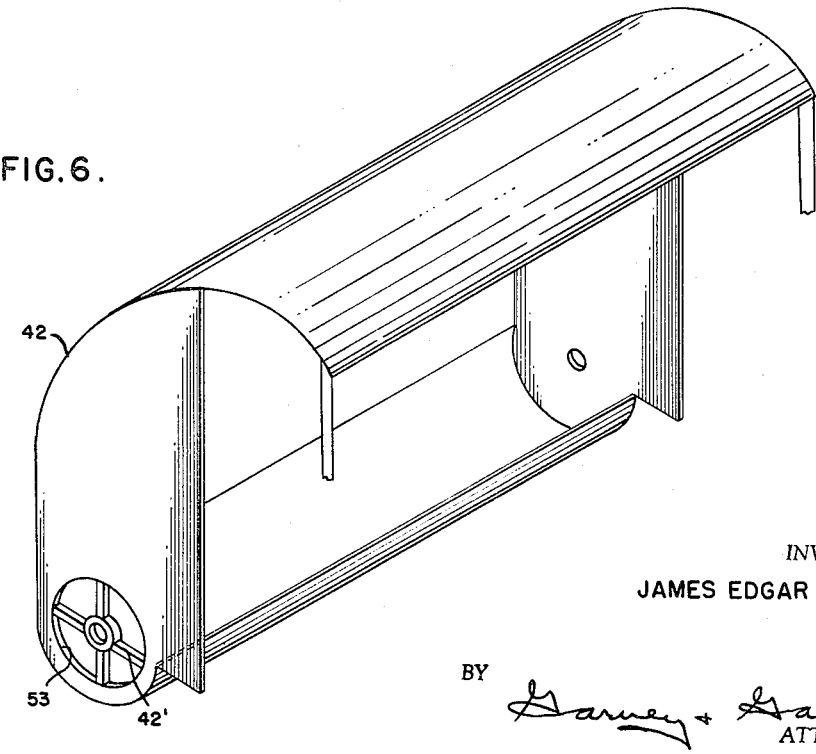
Fig. 6 is an enlarged perspective view of the cotton catch shield of the present invention.

The blower unit further includes an abutment plate 73 which is adapted to be suspended in a vertical position approximately mid-way the sides of the sub-frame 25 as illustrated to advantage in Figs. 2 and 3. The rear portion of the plate is engaged to the forward end of the sub-frame 25 by a chain 74. The forward end of the plate 73 is carried by one end of a cable 75, the opposite end being adjustably engageable with a hook 76 which is pendently supported by the forward end of the main body of the conduit 65. By this arrangement, the plate 75 may be raised and lowered so as to adjust its position with respect to the path of travel. Normally the lower edge of the plate rides in relatively close proximity to the top of the cotton row being worked, about midway between the lower ends of the blower branches 68. It has been found in actual use that this construction and arrangement of parts effectively blows the waste cotton from the furrows, either against or in close proximity to the opposite sides of the plate 73 so that the cotton is gathered along the center of the cotton row over which the picker wheel is traveling, resulting in a complete cotton salvaging operation.

In operation, after the power operated vehicle 10 and cotton picker assembly are coupled, as shown in the drawings, the picker wheel of the assembly is directed to a row from which the cotton has been harvested, the wheel being of a length to span the row. The assembly is pushed over the row by said vehicle and successive rows traversed until the field has been reharvested to salvage all waste cotton.

While I have herein shown and described a preferred embodiment of my invention, it is nevertheless to be understood, that various changes may be made therein, without departing from the spirit and scope of the appended claims.

What I claim is:

1. Apparatus for salvaging waste cotton comprising a movable frame, a cotton picker assembly carried by the frame and including cotton picking means adapted for movement along and contact with a harvested cotton row, the assembly also including blower means mounted on said frame, parts of the blower means extending fore of the cotton picking means and branching out to points beyond the opposite sides of the frame, free terminals of said parts of the blower means, lying adjacent the ground on opposite sides of the row, being traversed by the cotton picking means, for blowing waste cotton from opposite sides of the row onto the latter.

2. The apparatus of claim 1 with the addition of an abutment plate pendently carried by the front end of the movable frame, approximately midway between said free terminals of the blower, for intercepting the blown cotton at the center of the cotton row.

3. The apparatus of claim 1 wherein the picker assembly also includes a cotton conveyor in operative engagement with the cotton picking means for transferring the cotton salvaged by the picking means.

4. In combination with a power operated vehicle, apparatus for strategically positioning waste cotton on the ground preparatory to picking up the cotton and conveying it to a point of storage, including a frame detachably connected to said vehicle, an assembly carried by the frame and comprising a blower for gathering the waste cotton into a strategic position, the assembly also comprising cotton picking means to move upon and pick up the gathered cotton, the assembly further comprising a conveyor, in operative communication with said cotton picking means, for transferring the cotton, ejected from the picking means.

5. The combination of claim 4 with the addition of an abutment plate carried by said blower and movable with the frame along the longitudinal center of a cotton row to intercept cotton activated by the blower.

References Cited in the file of this patent

UNITED STATES PATENTS

| | | |
|---|---|---|
| 1,136,249 | Lint | Apr. 20, 1915 |
| 1,650,796 | Kellogg | Nov. 29, 1927 |
| 1,808,928 | Lint | June 9, 1931 |
| 2,441,244 | Kimball | May 11, 1948 |
| 2,592,270 | Getz | Apr. 8, 1952 |
| 2,670,584 | Rood et al. | Mar. 2, 1954 |
| 2,685,773 | Dauenhauer | Aug. 10, 1954 |
| 2,730,855 | Thomas | Jan. 17, 1956 |